Sept. 2, 1941.  C. P. PEPPER  2,254,709
CONTROL DEVICE
Filed March 20, 1940
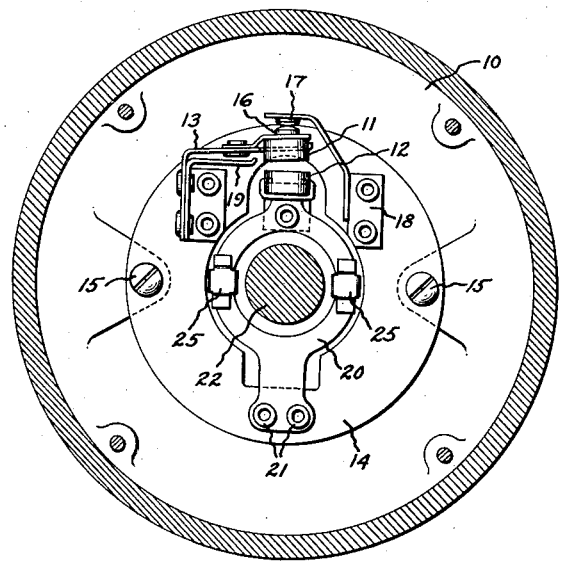
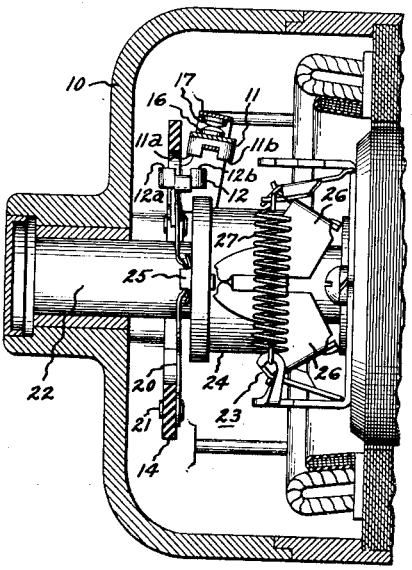
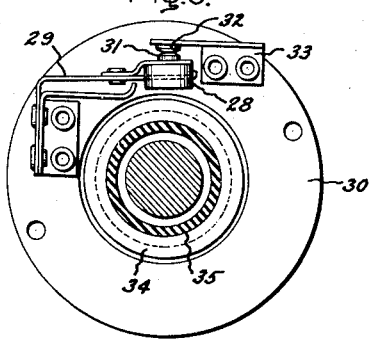
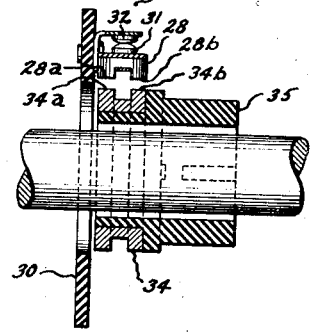
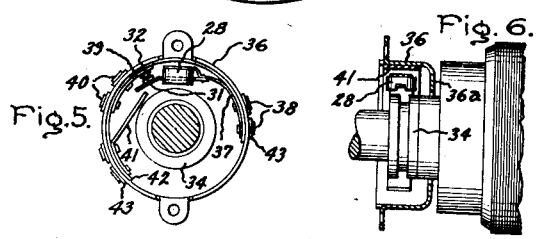
Inventor:
Carl P. Pepper,
by Harry E. Dunham
His Attorney.

Patented Sept. 2, 1941

2,254,709

UNITED STATES PATENT OFFICE 2,254,709

CONTROL DEVICE

Carl P. Pepper, Fort Wayne, Ind., assignor to General Electric Company, a corporation of New York Application March 20, 1940, Serial No. 324,989

5 Claims. (Cl. 200—80)

My invention relates to a control device and more particularly to a mechanically operated magnetic switch.

An object of my invention is to provide an improved control device which is simple in construction, reliable in operation, and which can be readily manufactured.

Another object of my invention is to provide a control device which will operate with a minimum of friction and noise.

Further objects and advantages of my invention will become apparent from the following description referring to the accompanying drawing, and the features of novelty which characterize my invention will be pointed out with particularity in the claims annexed to and forming a part of this specification.

In the drawing Fig. 1 is an end view of a dynamo-electric machine provided with my improved control device; Fig. 2 is a side elevation in partial section of the end of the dynamo-electric machine illustrated in Fig. 1; Fig. 3 is an end view of a modification of the control device illustrated in Figs. 1 and 2; Fig. 4 is a sectional side elevation of the control device illustrated in Fig. 3; Fig. 5 is an end view of a modification of the control device illustrated in Figs. 3 and 4, and Fig. 6 is a side elevation of a portion of an end of a dynamo-electric machine provided with the control device illustrated in Fig. 5.

My improved control device is illustrated and described in its application as a switch in the starting winding circuit of a dynamo-electric machine, but it is, of course, to be understood that my mechanically operated magnetic switch may have application in a variety of ways and particularly wherever it is desirable to have an abrupt movement of the switch resulting from a slow movement of an actuating device. Referring to the drawing, in Figs. 1 and 2 I have illustrated my improved control device attached to a stationary member 10 of a dynamo-electric machine, which control device may be used to control the starting winding. My improved control device includes a plurality of relatively movable magnets 11 and 12, magnetically associated with each other, which have unlike poles 11a, 11b, and 12a, 12b respectively. The poles have pole faces which are in substantially parallel planes. Let us assume pole 11a to be a north pole. Then 11b is a south pole. In order to have the magnets repel each other when they are in the position as illustrated in Figs. 1 and 2, then, 12a must be a south pole and 12b a north pole. Then when the magnets are in alignment, that is, when 11a is adjacent 12a and 11b is adjacent 12b, the magnetic force between their poles will cause them to attract each other. The magnet 11 is mounted on a spring member 13 which is in turn held by a base plate 14. The base plate is attached to the stationary member 10 of the dynamo-electric machine in any suitable manner, such as by bolts 15. The spring member 13 also carries a movable contact 16 which cooperates with a stationary contact 17. The contact 17 is mounted on the base plate 14 through a supporting bracket 18. In order to provide an arrangement for preventing movement of the magnet 11 toward the magnet 12, when in alignment with it to such an amount that the adjacent unlike poles would contact each other, a stop member 19 is provided. The magnet 12 which has its poles substantially facing the poles of the magnet 11 is mounted on a resilient member 20. The spring member 20 is in turn attached to the base plate in any suitable manner, such as by eyelets 21. Since my control device is mounted on the stationary member of the dynamo-electric machine the spring member 20 has a hole through it sufficiently large to allow the passage through it of a shaft member 22 upon which the rotatable member of the dynamo-electric machine is mounted. It will be seen, therefore, that the magnet 11 is mounted for movement in a direction substantially at right angles to the plane of the faces of the poles of the permanent magnets, while the magnet 12 is mounted for movement in a direction substantially parallel to the plane of the faces of the poles of the magnets. In other words, as the magnet 12 moves transversely across the faces of the poles of the magnet 11, the latter will be allowed to move toward and away from the former.

In order to provide an actuating member which will cause limited movement of the magnet 12 I have provided a centrifugal operating arrangement 23. Any suitable actuating mechanism may, of course, be used, it being only necessary to provide an arrangement for obtaining limited axial movement of the spring member 20. The centrifugal mechanism 23 illustrated in Fig. 2 forms no part of my invention, it being described and claimed in my copending application, Serial No. 302,383, which is assigned to the same assignee as the present invention. The centrifugal control mechanism includes an axially movable collar 24 which abuts against the spring member on its contact plates 25. The centrifugal mechanism and control device is illustrated in Fig. 2, when the motor is in its stationary position. Thus the contacts 16 and 17 are closed and the starting winding circuit is connected to any suitable source of supply. Upon rotation of the shaft 22 to a certain critical speed, weight members 26 will move outwardly overcoming the force of spring members 27, thus causing the collar member to move axially to the right. When the magnets are in a position illustrated in Fig. 2, like poles face each other and the magnetic force of repulsion therebetween causes the contacts to remain closed. However, as the collar member 24 moves to the right the spring member moves with it due to its natural resiliency. It will be seen, therefore, that at some critical point as the unlike poles approach each other, the magnetic force of attraction between the unlike poles will overcome the magnetic force of repulsion, thus causing the magnet 11 to abruptly move towards the magnet 12 until its travel is halted by contacting the stop member 18. The spring member 13 may be biased to either help or hinder this movement, or its normal position may be midway between the contact 17 and the stop 18, depending upon the desired characteristics of the control device. In the use of the control device as illustrated in Figs. 1 and 2, it is desirable to have the magnets attract each other when they are in alignment and repel each other when they move out of alignment, but it is, of course, to be understood that this condition may be reversed, or the magnets may be so arranged that relative movement merely varies the magnitude of the magnetic force therebetween.

In Figs. 3 and 4, I have illustrated a modification of the control device illustrated in Figs. 1 and 2 which has particular application when one of the magnets is to be mounted on a rotatable body. In this construction I have found it desirable to have the magnets repel each other when in alignment. The control device includes a magnet 28, with unlike poles 28a, 28b, which is mounted on a spring member 29 similar to the magnet 11 and the spring member 13, illustrated in Figs. 1 and 2. The spring member 29 is in turn supported on a base plate 30 which may be similar to the base plate 14 illustrated in Figs. 1 and 2. A movable contact member 31 is provided on the movable spring member 29 for cooperation with a stationary contact 32. This contact 32 is supported on the base 30 through a bracket member 33. However, instead of having a magnet similar to the magnet 28 for cooperation therewith, as is employed in the device shown in Figs. 1 and 2, I provide a cylindrically shaped magnet 34 which is magnetized with its annular unlike poles 34a and 34b facing outwardly in a direction toward the poles 28a and 28b of the magnet 28. The cylindrical magnet 34 is supported on an axially movable collar member 35. In this application I have found it desirable to have the magnets so arranged that poles 28a and 34a are alike and 28b and 34b are alike so that the magnets will repel each other when they are in alignment. It will be seen, therefore, that if the collar member and magnet 34 are actuated in an axial direction that the magnetic force between the two magnets will vary until at a critical point the attracting force will become stronger than the repulsive force, thus causing the magnet 28 to move in a radial direction and cause opening of the contacts 31, 32. The collar member 35 may be moved in an axial direction in any suitable manner, such as by a centrifugal mechanism illustrated in Fig. 2. It will be seen, therefore, that with the control device as illustrated in Figs. 3 and 4, that a centrifugal device is provided which may be applied to any suitable use, such as in the starting circuit of a dynamo-electric machine. With such a device there will be no rubbing contact between the centrifugal actuating mechanism and the switch member, thus providing for a minimum of noise and friction.

In Figs. 5 and 6 there is illustrated a modification of the control device shown in Figs. 3 and 4, which I have also found to have particularly efficient operation as a centrifugal switch for a dynamo-electric machine. In order to provide an arrangement for shielding the permanent magnets from the flux produced by the motor field windings, a substantially cylindrical magnetic shield 36 is employed. The shield has a portion 36a projecting inwardly so that the member 36 will effectively shield the permanent magnets. In addition to acting as a magnetic shield, I employ the member 36 as a support for the contacts and one of the magnets, so as to provide a control device which is simple in construction and which can be manufactured with a minimum of parts. Thus the magnet 28 and movable contact 31 are carried by a suitable resilient member 37 which is in turn mounted on the shield 36. The attachment may be made in any suitable manner, such as by bolts 38. Also, the stationary contact 32 is suitably carried by a metallic member 39 which is in turn mounted on the shield 36 and attached in any suitable manner, such as by bolts 40. A stop member 41 is also mounted on the shield. In order to electrically insulate the contacts from the shield an insulating member 42 is provided which extends around the inside periphery of the shield. Insulating washers 43 are provided between the heads of each of the bolts and the shield. Thus, it will be seen that I have provided a member which accomplishes the functions of a magnetic shield and support, so that an improved and efficient control device obtains.

In view of the foregoing it will be seen that I have provided a control device which employs mechanically actuated magnets which is simple in construction, efficient in operation, and which may have a variety of applications and be particularly efficacious where it is desired to have an abrupt movement of the contact as a result of the slow movement of an actuating mechanism.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States, is:

1. A centrifugal control device including relatively movable magnets having poles substantially facing each other, said first magnet having a cylindrical shape and being mounted for rotational and axial movement adjacent said second mentioned magnet, a centrifugal operating means for causing axial movement of said first magnet so as to vary the magnitude of the magnetic force between said magnets and to allow abrupt movement of said second magnet toward and away from said first magnet, and a circuit controlling device arranged to be actuated by the abrupt movement of said second magnet.

2. A control device for an electric apparatus including relatively movable contacts, means for actuating said contacts including permanent magnets, a metallic member for shieldng said permanent magnets from the magnetic flux produced by the electric apparatus, said contacts being supported by said shield, and means for insulating said contacts from said shielding member.

3. A centrifugal switch including a pair of magnets having pole faces lying in substantially parallel planes so as to produce a magnetic force between the poles of said magnets, a rotatable body, a centrifugally operated device mounted on said body and adapted to operate at a predetermined speed, one of said magnets being mounted for movement in an axial direction and a second of said magnets being mounted for movement in a radial direction, said centrifugally operated device being operatively connected with said first mentioned magnet so that upon operation of said device said first magnet will move in an axial direction thereby causing a reversal of the magnetic force between said magnets, said reversal of said magnetic force causing said second magnet to move in a radial direction, and a circuit controlling device arranged to be actuated by said radial movement of said second magnet.

4. A control device including relatively movable magnets adapted to produce magnetic forces between their poles, one of said magnets being mounted for rotational movement about an axis and axial movement along said axis, the other of said magnets being mounted for radial movement, means for causing axial movement of said first mentioned magnet upon rotational movement thereof so as to vary the magnitude of the magnetic force between said magnets and to allow movement of said second magnet in a radial direction, and a circuit controlling device arranged to be actuated by said radial movement of said second magnet.

5. A control device for a dynamo-electric machine having a winding including relatively movable contacts, means for actuating said contacts including permanent magnets, a metallic member for shielding said permanent magnets from the magnetic flux produced by the winding of said dynamo-electric machine, the contacts being supported by said shield, and means for insulating said contacts from said shielding member.

CARL P. PEPPER.